C. H. FULTON & T. M. BAINS, Jr.
PROCESS FOR DISTILLING METALLIC ORES.
APPLICATION FILED JAN. 24, 1917.

1,242,339.

Patented Oct. 9, 1917.
3 SHEETS—SHEET 1.

Inventors,
Charles H. Fulton
Thomas M. Bains, Jr.
By Bakewell & Chure Attys.

C. H. FULTON & T. M. BAINS, Jr.
PROCESS FOR DISTILLING METALLIC ORES.
APPLICATION FILED JAN. 24, 1917.
1,242,339.
Patented Oct. 9, 1917.
3 SHEETS—SHEET 2.
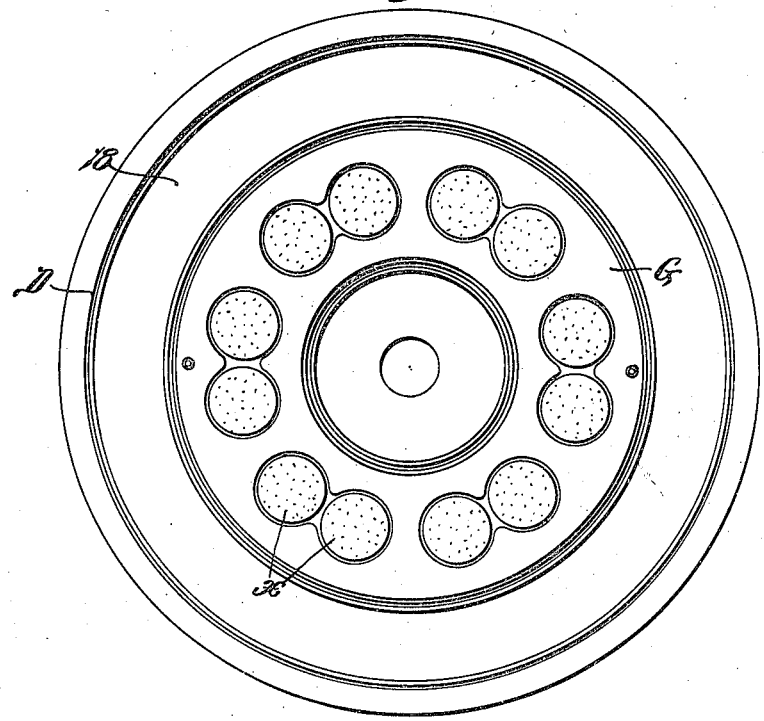
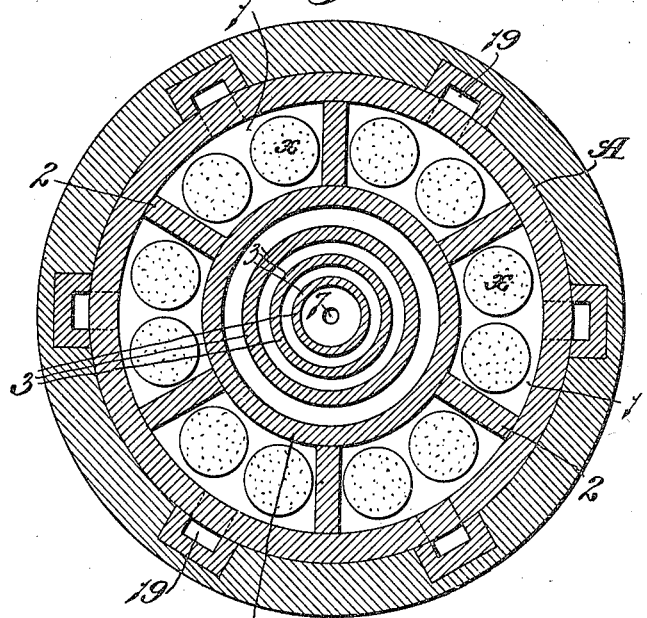

C. H. FULTON & T. M. BAINS, Jr.
PROCESS FOR DISTILLING METALLIC ORES.
APPLICATION FILED JAN. 24, 1917.
1,242,339.
Patented Oct. 9, 1917.
3 SHEETS—SHEET 3.
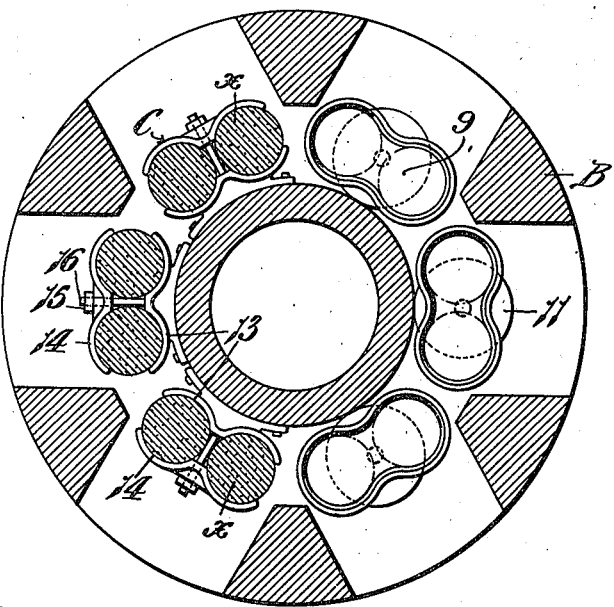
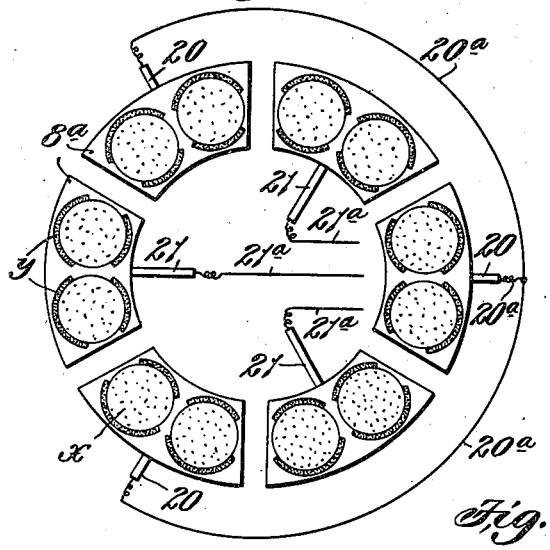
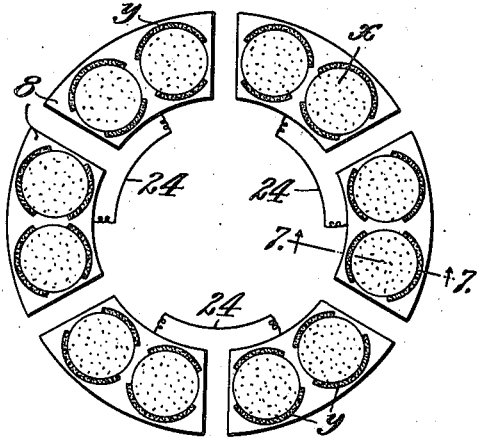
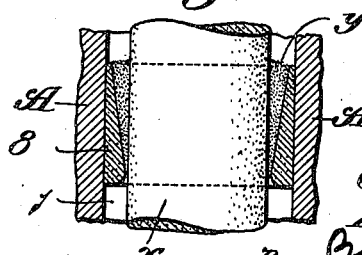
Inventors,
Charles H. Fulton,
Thomas M. Bains, Jr.
By Bakewell & Church Attys.

UNITED STATES PATENT OFFICE.

CHARLES H. FULTON AND THOMAS M. BAINS, JR., OF ST. LOUIS, MISSOURI, ASSIGNORS, BY MESNE ASSIGNMENTS, TO METALLURGICAL LABORATORIES, INCORPORATED, OF CHICAGO, ILLINOIS, A CORPORATION OF ILLINOIS.

PROCESS FOR DISTILLING METALLIC ORES.

1,242,339.     Specification of Letters Patent.     Patented Oct. 9, 1917.

Application filed January 24, 1917. Serial No. 144,139.

*To all whom it may concern:*

Be it known that we, CHARLES H. FULTON and THOMAS M. BAINS, Jr., citizens of the United States, residing in the city of St. Louis, State of Missouri, have invented a certain new and useful Improvement in Processes for Distilling Metallic Ores, of which the following is a full, clear, and exact description, such as will enable others skilled in the art to which it appertains to make and use the same.

This invention relates to the distillation and recovery of metals from their ores or from materials containing metals or their compounds.

One object of the invention is to provide a continuous process for distilling ores and metal-bearing materials that insures the recovery of an increased percentage of the metal content of the ore or material; which materially reduces the cost per ton of distilling ores and metal-bearing materials, and which enables metallic ores and metal-bearing materials to be distilled in a compact apparatus of simple design.

Another object is to provide a process for electrically distilling ores or materials containing metals or their compounds that can be accurately controlled.

And still another object is to provide a continuous process for electrically distilling metallic ores and metal-bearing materials, in which a constant potential current may be used in the distilling operation.

Broadly stated, the process consists in forming metallic ores or metal-bearing material into objects (hereinafter referred to as briquets) that will retain substantially their original form and volume when subjected to a distilling temperature, feeding said briquets through a distilling chamber either continuously or intermittently, heating said briquets while they are in the distilling chamber, so as to distil the metal content and thereafter, recovering the same, either as metal or metal compounds. The heating of the briquets is preferably effected by passing a current of electricity through the briquets, while they are in the distilling chamber, so as to develop sufficient heat within the briquets to practically completely distil the metal contained in the briquets, but the briquets can be heated in other ways without departing from the spirit of our invention.

Any suitable style of apparatus may be used for practising our process, but we prefer to use an apparatus of the construction described in our pending application Serial No. 155,223, filed March 16, 1917, which consists of an electric furnace, a condenser or collector for receiving the gases and vapors evolved in the distilling operation and means for feeding the briquets into and through the distilling chamber of the furnace in such a manner that the briquets act as a continuous resistor between the electrodes of the furnace. If desired, the apparatus, whether it be provided with an electric furnace or any other type of distilling furnace, can be equipped with a means for preheating the briquets so as to dry same and drive off the volatile matter, in case a hydrocarbon binding material is used in the process of forming the ore or material into briquets. The apparatus may also be provided with a baking chamber through which the briquets are passed before being introduced into the distilling chamber of the furnace, so as to bake the briquets sufficiently to make them good conductors of electricity. Our invention is applicable to the distillation and recovery of zinc, mercury, antimony, bismuth and other metals, either from their ores or from material containing such metals or their compounds, and while we have herein described our process as being used for the recovery of zinc from ores or any zinc-bearing material in the form of metallic zinc, we wish it to be understood that said process is not limited to this particular use.

In using our process in the recovery of zinc from zinc ore, we first form zinc-bearing ore into briquets in the manner described in U. S. Patent No. 1,193,680, to Charles H. Fulton, dated August 8, 1916, which, briefly described, consists in combining hard coal tar pitch or any other suitable binder with finely-divided zinc ore and coke, so as to form a mixture of the three, then heating said mixture, so as to cause the particles of ore and coke to be covered with the binder, and thereafter, forming said mixture into briquets of any desired shape in suitable molds in which they are subjected to a high pressure, preferably upward from 500 pounds to the square inch, to solidify the mixture and form it into as firm and compact a mass as possible. If a hydrocarbon binder is used, the briquets are heated either in a separate heating apparatus or in the distilling apparatus, so as to dry the briquets and drive off the volatile hydrocarbon of the binder, thus producing briquets, each of which consists of a large number of ore particles embedded in a coke matrix, which briquets will maintain both their form and volume during the distilling operation. When the distilling operation is carried on in an electric furnace, such briquets can be used to form a resistor conductor of the electric current between the electrodes of the furnace. It is immaterial, so far as our invention is concerned, how the briquets are formed, so long as they are of such a character that they will not disintegrate during the distilling operation or shrink away from the electrodes of the furnace, in case an electric distilling furnace is used. It is also immaterial whether said briquets are formed from zinc ore or from material that contains zinc.

Figure 1 of the drawings is a side elevational view, partly in vertical section, of an apparatus for practising our improved process of continuously distilling metallic ores and metal-bearing materials.

Fig. 2 is a top plan view of said apparatus.

Figs. 3 and 4 are horizontal sectional views, taken on the lines 3—3 and 4—4 of Fig. 1.

Fig. 5 is a top plan view of the bottom electrodes of the furnace.

Fig. 6 is a top plan view of the top electrodes of the furnace; and

Fig. 7 is a detail sectional view, illustrating the means that we prefer to use for insuring a good electrical contact between the electrodes of the furnace and the briquets.

Figure 1:
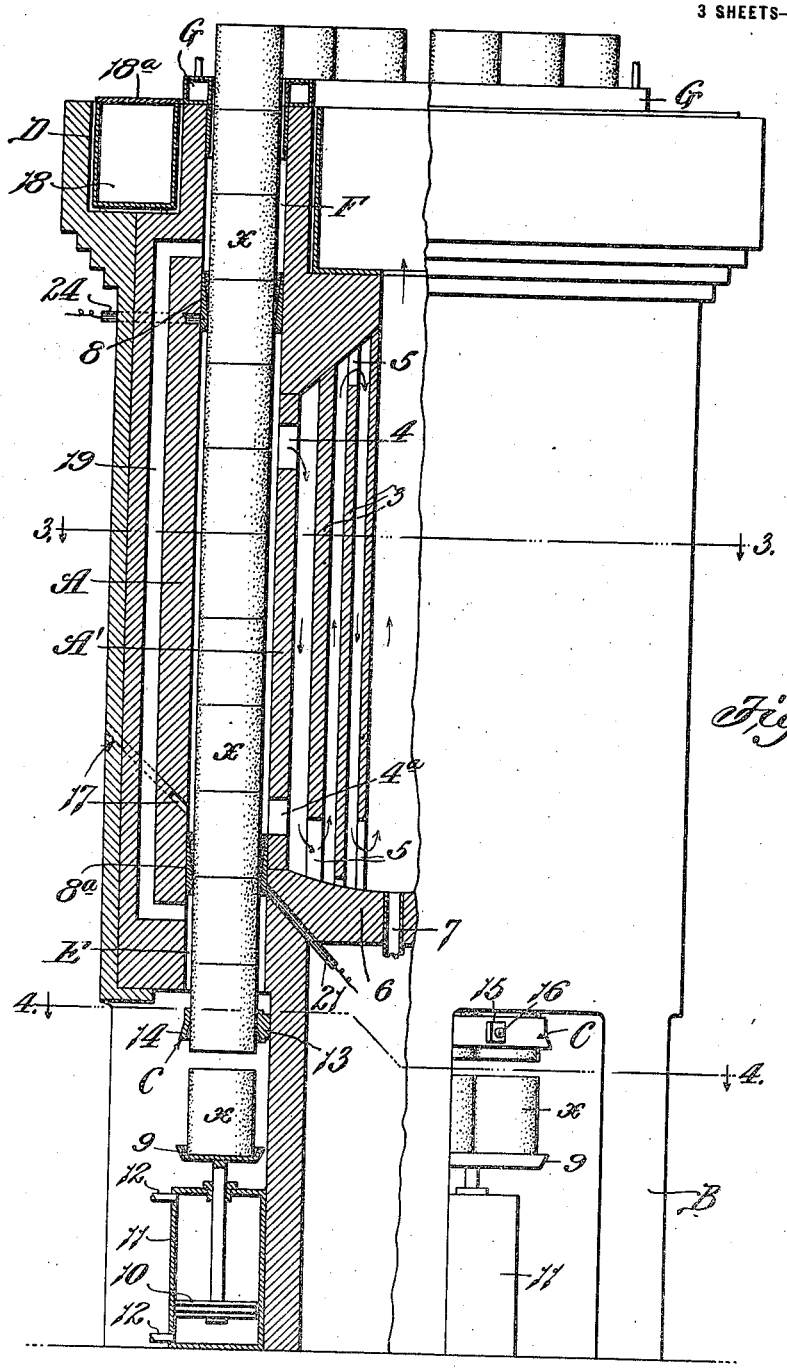

Referring to the drawings, which illustrate an apparatus in which our improved process can be practised, A and A' designate two cylindrical shells that are arranged in an upright position on a supporting structure B, so as to form the outer and inner walls, respectively, of an electric furnace that surrounds a condenser in which the metal vapors are condensed, if metallic zinc is being produced, or a collector into which air is blown if the apparatus is used for manufacturing oxid. In the furnace herein shown the annular space between the shells A and A' is divided into a number of segmental-shaped distilling chambers 1 by means of partitions 2. The condenser is formed by a plurality of tubular-shaped members 3 arranged inside of the inner shell A' of the furnace. The tubular-shaped members 3 of the condenser are arranged one within the other and are spaced apart so as to form a number of annular passageways, and the inner wall A' of the furnace is provided with openings 4 located at the upper end of the distilling chambers 1, so as to permit the gases and vapors evolved in the distilling operation to enter the condenser, the tubular members 3 of the condenser being provided with openings 5 arranged in such a manner that the metallic vapor will follow a tortuous path in traveling through the condenser, as indicated by the arrows in Fig. 1, and will sweep over the condensing surfaces formed by the members 3. The condenser is constructed of high temperature resisting material that will not be affected to any extent by the metallic vapor, and the furnace is formed from refractory material. Openings 4ª are formed in the inner wall A' of the furnace at the lower end of the distilling chambers 1, so as to permit any spelter that collects in said chambers to flow from same into the condenser, and the condenser is so constructed that any spelter which collects on the bottom 6 of the condenser will eventually flow to a spelter tap 7 located at the center of said bottom, as shown in Fig. 1.

Each of the distilling chambers 1 is provided at its upper and lower ends with electrodes 8 and 8ª that form part of an electric circuit, and means is provided for feeding briquets $x$ of the character previously described into and through the distilling chambers 1 of the furnace in such a manner that each distilling chamber will be provided with one or more columns of briquets that electrically connect the top and bottom electrodes 8 and 8ª of said chamber, thereby causing the briquets in the distilling chambers of the furnace to be heated sufficiently to practically completely distil the metal in same when a current of electricity is passed through the circuit. The electrodes 8 and 8ª can be formed in various ways. They consist of segmental-shaped members formed from carbon, graphite or other good electrical conducting and heat-resisting material, and they are arranged in such a manner that they form the top and bottom walls of the distilling chambers 1. The apparatus herein shown is so designed that each distilling chamber 1 will be provided with two parallel columns of briquets that can be moved upwardly through the chamber, and therefore, each bottom electrode 8ª and each top electrode 8 is provided with two holes of the same cross-sectional shape as the briquets. It is immaterial, so far as our broad idea is concerned, how the briquets are introduced into the distilling chambers and fed through said chambers, and it is also immaterial whether the briquets are fed intermittently or continously. In the apparatus herein shown the briquets are introduced into the distilling chambers intermittently and the columns of briquets are fed upwardly through the distilling chambers progressively, thereby enabling the distilling operation to be accurately controlled by increasing or decreasing the speed at which any column of briquets is fed through the furnace. One means that may be used for feeding the briquets into the distilling chambers and moving the columns of briquets upwardly through said chambers consists of a number of reciprocating feeding devices 9, one for each distilling chamber, arranged underneath the bottom electrodes 8$^a$ of the furnace and constructed in such a manner that two briquets can be positioned on each feeding device, as shown in Fig. 1. Each feeding device is provided with a piston 10 that is arranged in a cylinder 11 to which an operating medium, under control of the operator in charge of the apparatus, can be admitted and exhausted through pipes 12, so as to raise or lower the device 9, and clamping devices C of any suitable form are provided for sustaining the briquet columns in the various distilling chambers when the feeding devices 9 are moved downwardly into position to receive briquets, preparatory to the operation of introducing briquets into the furnace. A clamping device C is provided for each distilling chamber, each of the clamping devices herein shown consisting of a two-part clamp whose stationary element 13 is carried by the supporting structure B of the furnace and whose movable element 14 can be moved toward or away from the stationary element, by tightening or loosening a nut 15 on a bolt 16. In introducing the briquets into the furnace two briquets are arranged in operative position on one of the feeding devices 9, and said device is then moved upwardly, so as to cause the briquets on same to bear against the bottom briquets of the briquet columns in the distilling chamber with which said feeding device coöperates. The movable element of the clamping device C, which coöperates with that particular feeding device, is then released, and thereafter the feeding device is moved upwardly farther, so as to raise the two columns of briquets in the distilling chamber and bring the two briquets on the feeding device into alinement with the clamping device C. Thereafter, the movable element of said clamping device is tightened, so as to clamp the briquets positioned on the feeding device, and thus sustain the column of briquets supported by same, when the feeding device 9 is lowered into position to receive another charge of briquets.

The holes in the electrodes 8 and 8$^a$, through which the briquets pass, are large enough to compensate for slight inequalities in the briquets and permit the briquets to pass through same freely, and in order to electrically connect the electrodes with the briquet columns and insure a good electrical contact between said electrodes and briquet columns at all times, both when the briquets are stationary and when they are traveling past the electrodes, we prefer to make the holes in the electrodes slightly tapered or of conical form, as shown in Fig. 7 and fill the space between the sides of said holes and the exterior of the briquets positioned in the holes with granular conducting material $y$, such, for example, as graphite or carbon. The top electrodes are arranged in such a position that granular graphite or carbon can be introduced into the briquet holes in same through the openings in the top of the furnace through which the briquets are discharged, but the bottom electrodes are arranged in such a position that it is preferable to form ducts or passageways 17 in the outer wall A of the furnace, as shown in Fig. 1, so as to permit granular graphite or carbon to be supplied easily to the bottom electrodes.

As previously stated, the apparatus is provided with a preheating chamber in which raw briquets can be arranged so as to dry same, drive off the hydrocarbons of low melting point and increase the compressive strength of the briquets, and also a baking oven in which the briquets can be baked sufficiently to make them good conductors of electricity. One convenient way of constructing the apparatus is to form an annular preheating chamber D in the upper end of the outer shell A of the furnace, so as to utilize the heat that radiates from the briquets after they have passed out of the distilling chamber 1 to heat the raw briquets arranged in said chamber D. A baking oven E can be formed at the lower end of the furnace directly beneath the distilling chambers 1, so that the briquets will be baked during the time immediately preceding their entrance into the distilling chambers by the heat transmitted to same from the briquet columns in the distilling chambers. If desired, a briquet carrier 18 consisting of a pan of annular form can be arranged in the preheating chamber D, so as to permit said pan to be loaded with raw briquets, lifted by a crane or other suitable device into the preheating chamber, and thereafter removed from the preheating chamber, after the briquets have been dried. The baking oven E is formed by the annular space between the walls of the furnace that lies below the bottom electrodes 8$^a$ of the furnace, said oven being preferably divided into a number of sections or compartments, corresponding in number to the distilling chambers, by means of the partitions 2, previously described. Any volatile hydrocarbons that remain in the briquets after they have been dried in the preheating chamber D are driven off in the baking oven E, the gases escaping from said baking oven through ducts 19, shown in Fig. 1, that extend upwardly through the outer wall A of the furnace to a cooling chamber F arranged above the top electrodes 8 of the furnace. By constructing the furnace in this manner a pressure of hydrocarbon gas is maintained in the baking oven E and in the cooling chamber F, so as to prevent the metallic vapors from escaping from the distilling chambers through the joints between the briquets and the top and bottom electrodes. Furthermore, the pressure of hydrocarbon gas in the cooling chamber F eliminates the possibility of air entering the distilling chambers. If desired, a water jacket G can be arranged at the upper end of the furnace, as shown in Fig. 1, so as to cool the briquets as they are being discharged from the furnace, the briquets being preferably arranged on the cover $18^a$ of the briquet holder 18 in the preheating chamber D as soon as they are discharged from the furnace, so as to assist in heating the raw briquets and also facilitate the removal of the residue of the distilling operation.

If the furnace is designed for use with a three-phase connection of the Y-type, three of the bottom electrodes $8^a$ will be connected by means of carbon or graphite connections 20 with a neutral conductor $20^a$, and the other three bottom electrodes will be connected by means of carbon or graphite connections 21 with supply conductors $21^a$, as shown diagrammatically in Fig. 5. The top conductors 8 are connected in pairs by connections 24, as shown diagrammatically in Fig. 6. When the current is turned on, the current conveyed to the bottom electrodes by the supply conductors $21^a$ will pass upwardly through the columns of briquets that coöperate with said electrodes, to the top electrodes at the upper end of said columns, thence through the connections 24 to the top electrodes of the columns of briquets that coöperate with the bottom electrodes to which the neutral conductor $20^a$ is connected and down said columns to said neutral conductor. It is, of course, immaterial how the electric current is supplied to the columns of briquets in the furnace, so long as the electrical resistance of the briquets is such as to cause a sufficient heat development within the charge itself to practically completely distil the metal therefrom.

In starting a cold furnace it is preferable to use columns of thoroughly baked briquets of coke and pitch in the distilling chambers until the furnace is raised to normal working temperature. Thereafter, ore briquets or electrodes of the kind previously described are fed into and through the furnace. When the apparatus is in normal operation, raw briquets, namely, briquets that have not been heated or dried, are arranged in the briquet carrier 18, and said carrier is then positioned by means of a crane or other suitable device in the preheating chamber D. Some of the volatile matter in the carbonaceous binding material in the briquets is driven off by the heat to which the briquets are subjected while they are in the preheating chamber D, and the remainder of said volatile matter is driven off in the baking oven E. The distilled briquets, as they are discharged from the upper end of the furnace, are placed upon the cover of the briquet carrier 18, either manually, or by a mechanical unloading device, and after said carrier has received a load of distilled briquets, it is removed from the preheating chamber by means of a crane or other lifting device. Thereafter, the preheated briquets are removed from the carrier 18 and introduced into the furnace intermittently by the feeding devices 9 as the distilling process proceeds. In traveling upwardly through the baking oven E the briquets become thoroughly baked, so that they are good electrical conductors at the time they enter the distilling chambers. The briquets are relatively cool at the time they enter the distilling chambers of the furnace, usually at a temperature of about 700° C., but in traveling upwardly through said distilling chambers the current of electricity that passes through the briquet columns causes the temperature of the briquets to be raised gradually, so that by the time each briquet has reached the upper end of the distilling chamber in which it is arranged, practically all of the metal contained in the briquet will have been distilled out of same. The zinc vapors evolved in the distilling operation pass from the furnace into the condenser, wherein they are converted into spelter, and the carbon monoxid is allowed to escape from the upper end of the condenser. If desired, the carbon monoxid can be used either to preheat raw briquets or to heat a second condenser arranged above the condenser from which said carbon monoxid escapes.

By subjecting the briquets to a continuous distilling operation in the manner above described, either in an electric furnace or any other suitable type of distilling furnace, we obtain a constant flow of zinc vapor from the distilling furnace into the condenser, and thus secure better condensation than is possible with a process in which the distilling operation is interrupted from time to time to remove the residue from the distilling furnace and introduce a new charge into same. Such a process also makes it possible to use a constant potential current in the distilling operation, owing to the fact that it is not necessary to gradually heat up the distilling furnace and then rapidly increase the current, so as to raise the briquets to a distilling temperature, as is necessary in a process where a batch of ore or zinc-bearing material is electrically distilled. In our improved process the speed of distillation and the rate of distillation can be accurately controlled and the phases of the circuit can be kept balanced by increasing or decreasing the speed of feeding any certain column of briquets. By increasing the speed at which any column of briquets is fed through the furnace the resistance of said column will be increased, due to the introduction into the circuit of briquets that are not completely baked and which have a higher resistance than thoroughly baked briquets. The resistance of the briquets decreases rapidly with the increase in temperature up to about 700° C., so that by increasing the speed at which the briquets are introduced into the furnace, cooler briquets of higher resistance will be introduced into the circuit. In addition to the desirable features above pointed out, such a process materially reduces the labor cost, as the material is in such form and is introduced into the furnace and removed therefrom in such a manner that a compact apparatus can be used in practising the process and only a few operatives are required to run an apparatus of great capacity. The columns may be introduced either vertically or horizontally, or in any other manner without departing from the spirit of our invention.

Having thus described our invention, what we claim, and desire to secure by Letters Patent, is:

1. A continuous process for distilling ores and metal-bearing materials, characterized by feeding compressed objects containing the metal to be distilled through a distilling chamber, wherein said objects are subjected to heat, and varying the speed at which said objects are fed through said chamber so as to control the speed of distillation and the rate of distillation.

2. A distilling process, characterized by forming metallic ore or metal-bearing material into briquets that will retain their substantially original form and volume when subjected to a distilling temperature, causing said briquets to travel through a distilling chamber, and subjecting said briquets to heat while they are in said chamber.

3. A process for recovering the metal content of ores and metal-bearing materials which consists in forming ore or material of the character mentioned into briquets that will retain their substantially original form and volume when subjected to a distilling temperature, feeding said briquets into, through and out of a distilling chamber subjecting said briquets to heat while they are traveling through said chamber so as to vaporize the metal contained in same, and continuously supplying the products of the distillation to a condenser or collector.

4. A process for recovering the metal contained in ores or metal-bearing materials, which consists in forming ore or material of the character mentioned into briquets that will retain their substantially original form and volume when subjected to a distilling temperature, feeding said briquets into, through and out of a distilling chamber, subjecting them to heat while in said chamber so as to vaporize the metal contained in same, and thereafter subjecting said vapor to treatment so as to recover the metal contained in same.

5. A process for recovering the metal content of metallic ores or metal-bearing materials, which consists in combining ore or material of the character mentioned with a reducing agent and a binder, forming said mixture into briquets, feeding said briquets into a distilling apparatus intermittently so as to obtain a continuous supply of metal vapor, and treating said metal vapor so as to recover the metal in same.

6. A process for recovering the metal contained in metallic ores or metal-bearing materials, which consists in combining ore or material of the character mentioned with a reducing agent and a carbonaceous binder, forming said mixture into briquets and removing the hydrocarbons from the binder, feeding said briquets through a distilling chamber so as to vaporize the metal contained in same, and continuously supplying the products of the distillation to an apparatus in which they are treated so as to effect the recovery of the metal.

7. A distilling process, characterized by feeding objects containing the substance to be distilled through a distilling chamber, and electrically heating said objects while they are traveling through said chamber so as to vaporize the distillable substance contained in same.

8. A distilling process, characterized by causing briquets containing the substance to be distilled to travel through a distilling chamber, and passing a current of electricity through said briquets while they are in said chamber so as to heat them to a distilling temperature.

9. A distilling process, characterized by arranging briquets containing the substance to be distilled in a distilling chamber in such a manner that they form part of a circuit through which a current of electricity flows, thereby causing the briquets to be heated to a distilling temperature, and introducing fresh briquets into said circuit from time to time so as to obtain a continuous supply of products of distillation.

10. A distilling process, characterized by forming the material to be distilled into briquets that will act as electrical conductors, and feeding said briquets through the distilling chamber of an electric furnace in such a manner that they will form a resistor between the electrodes of the furnace while traveling through said chamber.

11. A distilling process, characterized by forming the material to be distilled into briquets that will act as electrical conductors, feeding said briquets through the distilling chamber of an electric furnace in such a manner that they will form a resistor between the electrodes of the furnace while traveling through said chamber, and controlling the speed of distillation and the rate of distillation by varying the speed at which the briquets are fed through said chamber.

12. A distilling process, characterized by forming the material to be distilled into briquets that will act as electrical conductors, arranging said briquets in the distilling chamber of an electric furnace so as to form a resistor between the electrodes of the furnace, passing a current of electricity through the circuit in which said electrodes and resistor are arranged, and adding fresh briquets to the circuit and feeding the briquets past said electrodes as the distilling operation proceeds so as to obtain a continuous supply of products of distillation.

13. A process for distilling metallic ores and metal-bearing materials, characterized by combining material of the character mentioned with a reducing agent and a binder, forming said mixture into briquets, and thereafter feeding said briquets into and through the distilling chamber of an electric furnace in such a manner that the briquets will travel past the electrodes of the furnace and form a resistor between said electrodes, thereby causing the briquets to be electrically heated to a distilling temperature in traveling through said chamber.

14. A process for distilling metallic ores and metal-bearing materials, which consists in forming ore or material of the character mentioned into briquets that will retain their substantially original form and volume when subjected to a distilling temperature, arranging a number of said briquets in the distilling chamber of an electric distilling furnace so they form part of the circuit through which a current of electricity is passing, and introducing fresh briquets into the circuit from time to time and progressively feeding the other briquets in said circuit through the distilling chamber.

15. A process for distilling metallic ores and metal-bearing materials, which consists in forming ore or material of the character referred to into briquets that will retain their substantially original form and volume when subjected to a distilling temperature, and supplying said briquets to the distilling chamber of an electric furnace in such a manner that the distilling operation is not interrupted by the introduction of fresh briquets into the distilling chamber or the removal from said chamber of briquets that have been subjected to a distilling operation.

16. A process for distilling metallic ores and metal-bearing materials, which consists in forming ore or material of the character mentioned into briquets that will retain their substantially original form and volume when subjected to a distilling temperature, preheating said briquets and feeding them through the distilling chamber of an electric furnace, and passing a current of electricity through the briquets while they are traveling through the distilling chamber of the furnace so as to vaporize the metal contained in same.

In testimony whereof, we hereunto affix our signatures, at St. Louis, Missouri, this 22nd day of January, 1917.

CHARLES H. FULTON.
THOMAS M. BAINS, JR.